US012750338B1

(12) United States Patent
Anandakrishnan et al.

(10) Patent No.: US 12,750,338 B1
(45) Date of Patent: Sep. 29, 2026

(54) CONTROLLER FOR COORDINATING FLOW SEPARATION OF INTRA-VPC OR INTER-VPC COMMUNICATIONS

(71) Applicant: AVIATRIX SYSTEMS, INC., Santa Clara, CA (US)

(72) Inventors: Geetha Anandakrishnan, Santa Clara, CA (US); Susan Hinrichs, Santa Clara, CA (US); Narayanan Meiyyappan, Santa Clara, CA (US); Sai Kartikeya Vemuri, Santa Clara, CA (US); Li Yan, Santa Clara, CA (US); Mandar Jog, Santa Clara, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 255 days.

(21) Appl. No.: 17/902,877

(22) Filed: Sep. 4, 2022

(51) Int. Cl.

| | |
|---|---|
| ***H04L 29/00*** | (2006.01) |
| ***H04L 9/40*** | (2022.01) |
| ***H04L 12/46*** | (2006.01) |
| ***H04L 47/20*** | (2022.01) |

(52) U.S. Cl.
CPC ...... *H04L 63/0227* (2013.01); *H04L 12/4641* (2013.01); *H04L 47/20* (2013.01); *H04L 63/0272* (2013.01); *H04L 63/20* (2013.01)

(58) Field of Classification Search
CPC . H04L 63/0227; H04L 12/4641; H04L 47/20; H04L 63/0272; H04L 63/20
See application file for complete search history.

(56) References Cited

U.S. PATENT DOCUMENTS

| | | | | |
|---|---|---|---|---|
| 11,240,203 | B1 * | 2/2022 | Eyada | H04L 63/20 |
| 11,487,570 | B1 * | 11/2022 | Shpilyuck | H04L 63/101 |
| 2011/0216651 | A1 * | 9/2011 | Bansal | H04L 69/326 370/235 |
| 2015/0372980 | A1 * | 12/2015 | Eyada | G06F 21/55 726/1 |
| 2017/0064005 | A1 * | 3/2017 | Lee | H04L 67/141 |
| 2020/0059492 | A1 * | 2/2020 | Janakiraman | H04L 12/4641 |

* cited by examiner

*Primary Examiner* — Jeffrey C Pwu
*Assistant Examiner* — Helai Salehi
(74) *Attorney, Agent, or Firm* — Jackson Walker LLP

(57) ABSTRACT

A controller features classification logic and rule generation logic. Based on recovered information associated with a newly discovered endpoint, the classification logic is configured to determine a virtual region in which the newly discovered endpoint resides. The rule generation logic is configured to (a) generate a first subset of rules for controlling a flow of messages between a destination and a source via native cloud constructs associated with a cloud service provider (CSP) underlay network when the destination and source reside within a first virtual region and (b) generate a second subset of rules for controlling a flow of messages between the destination and the source via an overlay network providing communications between the first virtual region and a second virtual region when the destination and the source reside within different virtual regions.

18 Claims, 11 Drawing Sheets

CONTROLLER FOR COORDINATING FLOW SEPARATION OF INTRA-VPC OR INTER-VPC COMMUNICATIONS

FIELD

Embodiments of the disclosure relate to the field of networking. More specifically, one embodiment of the disclosure relates to a controller that controls and maintains (i) security group orchestration involving native cloud constructs to control a flow of messages between endpoints within the same virtual networking infrastructure and (ii) gateway policy enforcement to control a flow of messages between different virtual networking infrastructures.

GENERAL BACKGROUND

Over the past few years, cloud computing has provided Infrastructure as a Service (IaaS), where the operations of native cloud constructs for all types of public cloud networks, such as AMAZON® WEB SERVICES (AWS), MICROSOFT® AZURE® Cloud Services, GOOGLE® Cloud Services or ORACLE® Cloud Services for example, may be controlled. For example, a tenant may subscribe to a web service to provision one or more virtual servers to run tenant's application programs in a cloud computing environment. Native cloud constructs, operating as a security group, are used to protect the virtual servers and the application programs that they are running.

In general, a security group operates as a virtual (OSI Layer 4) firewall deployed within a public cloud network. As a virtual firewall, the security group controls ingress (inbound) network traffic to and/or egress (outbound) network traffic from resources with a virtual networking infrastructure that are associated with the security group. Herein, a virtual networking infrastructure may include virtual private clouds for AMAZON® WEB SERVICES (AWS) or GOOGLE® Cloud Services, virtual networks (VNets) for MICROSOFT® AZURE® Cloud Services, virtual cloud networks for ORACLE® Cloud Services, or the like.

Upon creation, a virtual private cloud (or VNet) may be associated with a default security group. Additional security groups for each virtual private cloud (or VNet) may be created, where different security groups may be associated with different resources in the virtual private cloud (or VNet). For each security group, a set of rules (e.g., one or more rules) may be added to control the propagation of network traffic based on a variety of different factors, such as protocol type and port numbers for example. There may also be a separate sets of rules for inbound network traffic into and outbound network traffic from the virtual private cloud (or VNet).

While providing controls for network traffic, a security group poses significant limitations on network design with respect to scalability. For example, for each network deployment, there are a limited number of security groups that may be deployed within the network. Also, besides the limited number of security groups, only a limited number of rules may be utilized for each security group. Therefore, different network traffic controls are needed to allow for increased scalability to account for the ever-growing usage of public cloud networks as well as to support multi-cloud traffic controls that are unavailable from security groups as each security group is restricted to network controls concerning a single public cloud network.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
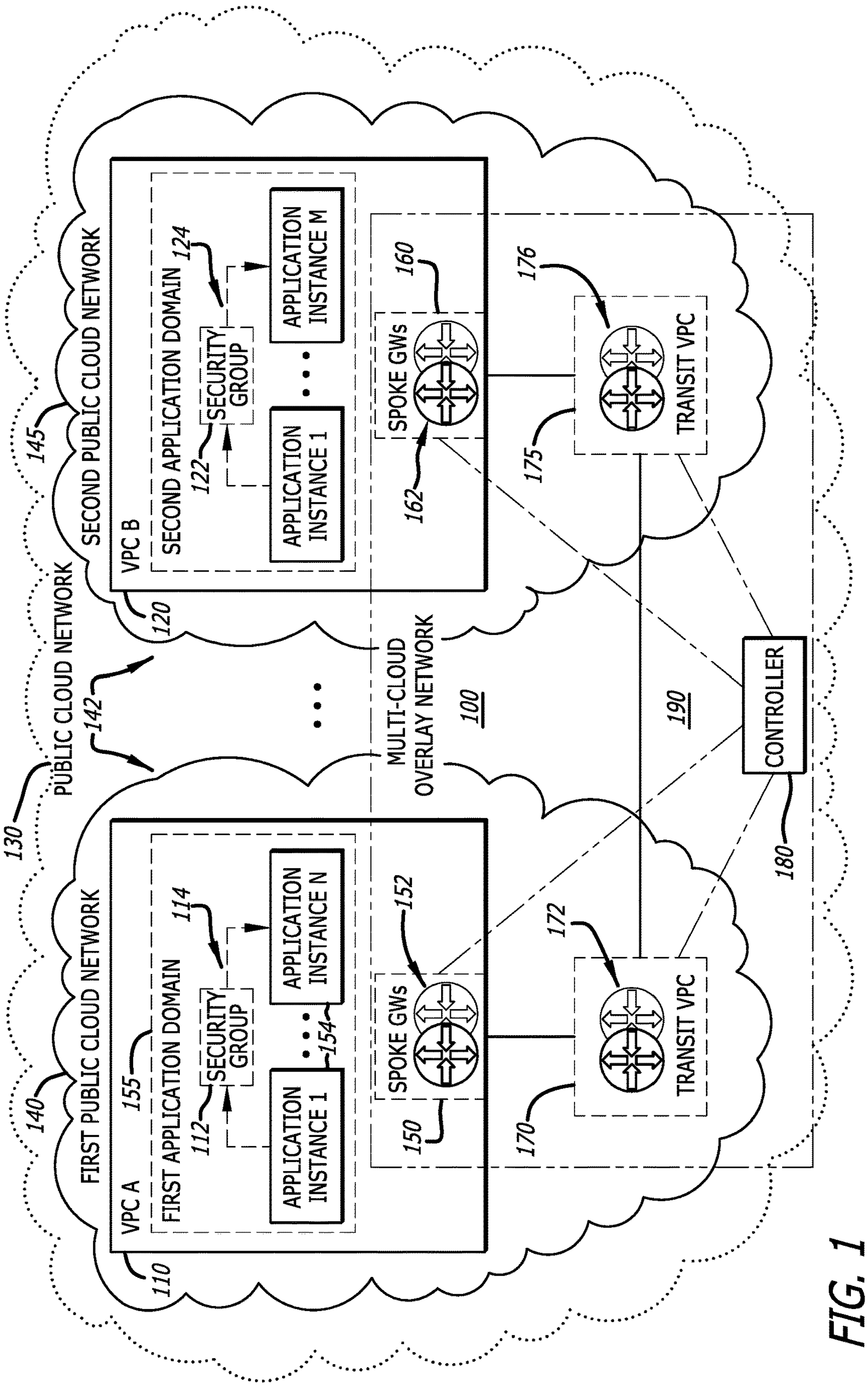
FIG. 1 is an exemplary embodiment of a multi-cloud overlay network corresponding to a software-defined cloud overlay network supporting intra-VPC communications within a single public cloud network or among VPCs deployed in different public cloud networks.

Embodiments of a controller that supports a network traffic filtering scheme, which relies on (i) one or more security groups formed by native cloud constructs associated with a cloud service provider (CSP) underlay network to enforce policies involving communications between endpoints residing within the same virtual networking infrastructure and (ii) a software-defined (cloud or multi-cloud) overlay network to enforce policies involving communications between endpoints within different virtual networking infrastructures. Herein, according to one embodiment of the disclosure, as described below, an endpoint may include software components such as cloud-based instances (e.g., application instances, virtual machine (VM), etc.) for example. The virtual networking infrastructures may include virtual private clouds deployed within AMAZON® WEB SERVICES (AWS) or GOOGLE® CLOUD services, virtual networks (VNets) for MICROSOFT® AZURE® cloud services, virtual cloud networks for ORACLE® Cloud Services, or the like. For ease and consistency, we shall refer to all types of these virtual networking infrastructures, independent of the cloud service provider, as a "virtual private cloud network" or "VPC."

More specifically, the overlay network may include a data plane and a control plane. According to one embodiment of the disclosure, the control plane may feature a controller, multiple (two or more) transit gateway VPCs, and multiple spoke gateway groups enforcing traffic to spoke VPCs that may be deployed within different VPCs residing in the same or different public cloud networks. Each transit gateway VPC may include a plurality of transit gateways and each spoke gateway group includes a plurality of spoke gateways (e.g., primary and secondary spoke gateways). The plurality of gateways are deployed for load balancing as well as redundancy, high-availability, and/or disaster recovery. Herein, the overlay network may be configured as a single cloud overlay network in which spoke gateway groups are deployed as software components within different VPCs residing in the same public cloud network or as a multi-cloud overlay network in which the spoke gateway groups are deployed as software components within different VPCs residing in different public cloud networks.

Herein, operating as a centralized network traffic manager, the controller is configured to coordinate network traffic via the native cloud constructs or the overlay network. Such coordination may involve the transmission of control information from the controller to (i) data stores accessible by at least the spoke gateways of the overlay network and/or (ii) native cloud constructs of the (CSP) underlay network that control operability of a security group. The control information may include one or more rules created by policies established to control communications between different domains (referred to as "application domains"), where the rules are enforced by a security group or one or more spoke gateways associated with a spoke gateway group to which the communications are directed.

More specifically, the control information may include rules based on policies that influence the propagation of inter-VPC network traffic over the overlay network as well as rules based on policies that influence the propagation of intra-VPC network traffic over the (CSP) underlay network. The rules to control inter-VPC network traffic may include new or updated filtering rules that are maintained within a gateway data store and enforced by a spoke gateway to control incoming/outgoing network traffic from a VPC featuring the destination/source of the network traffic. The rules to control intra-VPC network traffic may include rules that pertain to a security group (created or modified), where the security group may be associated with and enforced by a network interface controller of the cloud-based instance (e.g., VM instance). As a result, inter-VPC network traffic is controlled by the spoke gateways while intra-VPC network traffic is controlled by native cloud constructs.

As described above, the separation of policy enforcement by different software components, based on whether the policies are applicable to intra-VPC network traffic or inter-VPC network traffic, provides a number of advantages, including the following:

(1) Leveraging native constructs (e.g., CSP backbone underlay network) for intra-VPC network traffic lowers the cost and the latency of the network traffic within the same VPC.

(2) Separation of policy engagement (e.g., security controls) for intra-VPC communications and inter-VPC communications provides scalability of collective security provided by security groups orchestrated using native constructs and policy engagements managed by spoke gateways.

As described herein, a multi-cloud network features a plurality of public cloud networks, each public cloud network includes one or more VPCs. A multi-cloud overlay network is configured to support communications between cloud-based instances residing in different VPCs, such as an application instance operating within a first application domain residing within a first VPC and a VM instance operating within a second application domain residing within a second VPC different from the first VPC. In general, a "VPC" is an on-demand, configurable pool of shared resources, which may be allocated as part of an overlay network infrastructure and provide a certain level of isolation between the different tenants. Some VPCs may include a spoke gateway group, which features one or more spoke gateways that are used as entry (or ingress) points or exit (or egress) points in the filtering of data messages directed to destination applications that reside within a different VPC than the source application.

A spoke gateway group is a collection of computing devices, namely one or more spoke gateways responsible for controlling a flow of network traffic, such as network traffic between software components and a cloud-based service that may be available to multiple (two or more) tenants. For example, at least a pair of spoke gateways (e.g., primary and secondary spoke gateways) may be deployed for redundancy, high-availability, or disaster recovery. Each "spoke gateway" corresponds to a component (e.g., software instance) that supports filtering of network traffic between endpoints residing in two different VPCs, such as from an application instance (residing within a first VPC) that is requesting a cloud-based service and a cloud-based service maintained within the second VPC. Each spoke gateway has access to a gateway data store, which identifies rules based on policies (e.g., security policies, filtering policies, routing policies, etc.) for a transfer of data received by the spoke gateway from a source, such as from an application instance to a transit gateway deployed within a transit VPC for subsequent transfer to a spoke gateway deployed within another spoke gateway group. The spoke gateway enforces policy on inter-VPC network traffic by permitting or dropping network traffic spanning different VPCs, while policy enforcement for intra-VPC network traffic remains with the native cloud constructs associated with an orchestrated security group.

A "transit VPC" may be generally defined as a collection of computing devices, namely one or more transit gateways, which are responsible for furthering assisting in the propagation of network traffic (e.g., one or more messages) between different VPCs, such as between different spoke gateways within different spoke gateway groups. For example, a plurality of transit gateways (e.g., primary transit gateway, secondary transit gateway) may be deployed within each transit VPC for redundancy, high-availability, or disaster recovery to retain communications between spoke gateway groups residing in different VPCs even where one or more spoke gateways fails.

According to one embodiment of the disclosure, operating as a software instance, the controller may be adapted to configure software components that support separate policy enforcement for intra-VPC network traffic and inter-VPC network traffic. More specifically, the controller may be configured with logic to support policy enforcement through security group orchestration and spoke gateway configuration. This logic may include, but is not limited or restricted to the following: endpoint discovery logic, classification logic, security group generation logic, and/or rule generation logic.

In general, the endpoint discovery logic is configured to identify newly added, modified, and/or deleted endpoints (e.g., VM instances) within one or more public cloud networks that pertain to an existing application domain or a newly formed application domain. Such identification may be accomplished by (i) polling an Application Programming Interface (API) of a cloud service provider (CSP) to obtain a current inventory of endpoints for the CSP network for comparison to discovered endpoints or (ii) subscribing to a CSP notification to provide a new discovery list of existing endpoints. Thereafter, contents of the endpoint discovery inventory are compared to contents of the existing discovery list to determine new endpoints. The existing discovery list may be stored by the controller.

The classification logic is configured, based on recovered information associated with an endpoint (e.g., its identifier (e.g., name, data representation, etc.), tag, application domain identifier, and/or VPC identifier), to determine the VPC and/or the application domain upon which the endpoint resides. From this information, the controller may be configured to maintain an endpoint-VPC identifier mapping for use by the security group generation logic in determining whether security group orchestration is needed to support intra-VPC communications between endpoints.

Herein, the security group generation logic is configured to generate one or more network security groups, namely a virtual firewall that is associated with an identified endpoint (e.g., network interface controller of the endpoint). Each virtual firewall subjects a virtual computing device (e.g., AWS elastic compute cloud "EC2" instance, Azure® VM, etc.) responsible for processing network traffic pertaining to VM instances associated with a particular application domain to the same Open Systems Interconnection (OSI) Transport Layer (L4) policies. The L4 policies are formulated through sets of rules generated by the rules generation logic, where the rule sets are designed to filter both incoming and outgoing intra-VPC network traffic from the virtual computing device. Such filtering may constitute a first subset of rules directed to incoming intra-VPC traffic and a second subset of rules directed to outgoing inter-VPC network traffic.

As described above, the rule generation logic is configured to generate a first set of rules to orchestrate native cloud constructs in supporting intra-VPC filtering. Additionally, the rule generation logic may be configured to generate a second set of rules to orchestrate policy enforcement by one or more spoke gateways for inter-VPC filtering. Herein, as the controller is aware of the location of each of the software components within the multi-cloud network, upon an application instance (first software component) sending a data message to another application instance (second software component), the native cloud constructs for security group enforcement may be configured to determine whether the source and destination are within the same VPC or not. Where the destination resides within a VPC different from the VPC including the source, the spoke gateways are responsible for enforcing policies on the data messages (e.g., port restrictions, protocol restrictions, destination restrictions, etc.). Otherwise, where the destination resides in the same VPC as the source, the security group (native cloud constructs) apply rules to enforce policies without involvement of the spoke gateways.

I. Terminology

In the following description, certain terminology is used to describe features of the invention. In certain situations, each of the terms "component," endpoint," and "logic" is representative of hardware, software, or a combination thereof, which is configured to perform one or more functions. As hardware, the component (or endpoint or logic) may include circuitry having data processing and/or storage functionality. Examples of such circuitry May include, but are not limited or restricted to a processor (e.g., microprocessor, one or more processor cores, a programmable gate array, a microcontroller, an application specific integrated circuit, etc.); non-transitory storage medium; a superconductor-based circuit, combinatorial circuit elements that collectively perform a specific function or functions, or the like.

Alternatively, or in combination with the hardware circuitry described above, the component (or endpoint or logic) may be software in the form of one or more software modules. The software module(s) may be configured to operate as one or more software instances with selected functionality (e.g., virtual processor, data analytics, etc.) or as a virtual network device including one or more virtual hardware components. The software module(s) may include, but are not limited or restricted to an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical, or other form of propagated signals such as carrier waves, infrared signals, or digital signals). Examples of non-transitory storage medium may include, but are not limited or restricted to a programmable circuit; a superconductor or semiconductor memory; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device.

One type of component may be a cloud component, namely a component that operates as part of a multi-cloud overlay network as described below. Cloud components are configured to control message filtering between other components deployed within one or more public cloud networks. Other types of cloud components may operate as part of a native cloud infrastructure of a public cloud network and may be specifically referred to as "native cloud components."

Controller: A "controller" is generally defined as a component that provisions and manages operability of cloud components within one or more VPCs deployed within a single public cloud network or within the multi-cloud network spanning two or more public cloud networks. The provisioning and managing of the cloud components may be conducted, inter alia, to establish policies that control network traffic and provide enhanced security to the multicloud network, including the transmission of data, between components within different public cloud networks.

Tenant: Each "tenant" uniquely corresponds to a particular customer provided access to the cloud or multi-, such as a company, individual, partnership, or any group of entities (e.g., individual(s) and/or business(es)).

Endpoint: An "endpoint" is generally defined as one or more software components configured to perform a particular function. For example, the endpoint may include a software instance, such as an application or virtual machine (VM) instance, configured to perform functions based on information received from cloud components. For example, the endpoint may correspond to a virtual web server, a virtual database, software component of an application, or the like.

Computing device: A "computing device" is generally defined as virtual or physical logic with data processing, filtering, and/or data storage functionality. For example, a computing device may correspond to a virtual device that is responsible for controlling communications between different endpoints, such as a gateway for example.

Gateway: A "gateway" is generally defined as virtual or physical logic with data monitoring or data routing and/or filtering functionality. As an illustrative example, a first type of gateway may correspond to virtual logic, such as a data transfer software component that is assigned an Internet Protocol (IP) address within an IP address range associated with a virtual networking infrastructure (VPC) including the gateway, to handle (control) the flow of messages from or into a VPC. Herein, the first type of gateway may be identified differently based on its location/operability within a public cloud network, albeit the logical architecture is similar.

For example, a "spoke" gateway is a software component that supports routing and/or filtering of network traffic between a cloud component residing within a first VPC and a cloud component residing within a second VPC. For example, multiple spoke gateways may be deployed as a spoke gateway group (e.g., one or more spoke gateways from the same or different subnet) and reside within the first VPC. A "transit" gateway is a software component configured to further assist in the propagation of network traffic (e.g., one or more messages) between different VPCs such as different spoke gateways within different spoke gateway groups. Each of these software components is addressable (e.g., assigned a network address such as an IP address). Alternatively, in some embodiments, a gateway may correspond to a physical component.

Transmission Medium: A "transmission medium" is generally defined as a physical or logical communication link (or path) between two or more components. For instance, as a physical communication link, wired and/or wireless interconnects in the form of electrical wiring, optical fiber, cable, bus trace, or a wireless channel using infrared, radio frequency (RF), may be used. As a logical communication link, AWS Direct Connect, Azure® ExpressRoute, an API, a function call or other local communication scheme may be used to communicatively couple two or more components together.

Computerized: This term and other representations generally represents that any corresponding operations are conducted by hardware in combination with software.

Create: The term "create" along with other tenses for this term generally represents generation of a component, such as a VPC or a gateway residing within the VPC, which may be conducted automatically through machine learning or other artificial intelligence (AI) logic or may be conducted manually based on input of data or selection of data elements (e.g., pull-down menu items, trigger switch setting, etc.) rendered as part of a GUI display element accessible by a tenant administrator.

Message: Information in a prescribed format and transmitted in accordance with a suitable delivery protocol. Hence, each message may be in the form of one or more packets (e.g., data plane packets, control plane packets, etc.), frames, or any other series of bits having the prescribed format. A "communication" constitutes one or more messages during a transmission of information from a source to a destination.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Network Architecture

Referring to FIG. 1, an exemplary embodiment of a control plane 190 configured with a controller 180 that maintains policies directed to routing/filtering of (i) network traffic between endpoints within the same VPC (e.g., intra-VPC network traffic) and (ii) network traffic between endpoints within different VPCs (e.g., inter-VPC network traffic) is shown. Policy enforcement for intra-VPC network traffic within a first VPC (VPC A) 110 is performed by one or more security groups 112, which are formed by native cloud constructs associated with a first public cloud network 140. The security group(s) 112 formulates a portion of a software-defined network 114 that is provided by a cloud service provider (hereinafter, "CSP network" 114). A similar architecture exists for a second VPC (VPC B) 120, where policy enforcement for intra-VPC network traffic within the second VPC 120 is performed by one or more security groups 122 formed by native cloud constructs associated with the second public cloud network 145. The security group(s) 122 formulate a portion of a software-defined network 124 provided by a service provider (hereinafter, "CSP network 124").

Additionally, for the first VPC 110 residing in the first public cloud network 140, policy enforcement of inter-VPC network traffic, namely egress (outbound) and ingress (inbound) communications from the first VPC 110, is performed by one or more spoke gateways 152. Similarly, for the second VPC 120 residing in the second public cloud network 145, policy enforcement of inter-VPC network traffic is performed by one or more spoke gateways 162. Both the spoke gateway(s) 152 and 162 operate as interfaces for the multi-cloud overlay network 100 that routes messages between components operating within different VPCs (e.g., the first VPC 110 and the second VPC 120).

According to one embodiment of the disclosure, the multi-cloud overlay network 100 may correspond to a software-defined cloud overlay network configured to support inter-VPC communications between VPCs deployed within a single public cloud network 130 or among VPCs deployed in different public cloud networks 140/145, as shown. The multi-cloud overlay network 100 enables communications between different VPCs, such as the first VPC

110 and the second VPC 120 when deployed within (i) the single public cloud network 130 (represented in the alternative) or (ii) a multi-cloud network 142 such as formed by the first public cloud network 140 and the second public cloud network 145. Herein, the multi-cloud network 142 supports communications between the first VPC 110 and the second VPC 120 while native constructs provided by the first public cloud network 140 and associated with the CSP network 114 control the message propagation between application instances 154 residing within application domain 155 within the first VPC 110.

The multi-cloud overlay network 100 may include spoke gateway groups residing within VPCs supported by the multi-cloud overlay network 100. More specifically, a first spoke gateway group 150 may be configured to reside within the first VPC 110 while a second spoke gateway group 160 may be configured to reside within the second VPC 120. The first spoke gateway group 150 includes one or more spoke gateways 152 that support egress and ingress communications from the first VPC 110 to other VPCs within the first public cloud network 140 and/or within the second public cloud network 145. Similarly, the second spoke gateway group 160 includes one or more spoke gateways 162 that support egress and ingress communications from the second VPC 120 to other VPCs within the second public cloud network 145 and/or the first public cloud network 140. Communications from the first and second spoke gateway groups 150 and 160 are provided by transit VPCs 170 and 175. The transit VPCs 170 and 175 operate as a networking backbone to enable communications between the spoke gateway(s) 152 and 162 residing within the same public cloud network and/or different public cloud networks 140 and 145, as shown.

The controller 180 is part of the control plane 190 that includes the multi-cloud overlay network 100. The controller 180 is adapted to provide control messages to populate a local data store utilized by the security groups 112/122 with filtering rules and/or policies to control message propagation via native cloud constructs forming the CSP network 114/124 as well as gateway data stores (see FIG. 2B) that control the filtering to and from the spoke gateways 152/162 within the spoke gateway groups 150/160. Additionally, the controller 180 provides control messages to the transit VPCs 170/175 to populate routing data stores utilized by the transit gateways 172/176 in supporting ingress and egress communications.

In summary, the multi-cloud network supports inter-VPC communications within the multi-cloud overlay network 100 while native cloud constructs 112/114 or 122/124 support communications between application instances 154 or 164 within their same VPC 110 or 120. For example, native cloud constructs 112/114 associated with the first public cloud network 140 are utilized to provide and support communications between application instances 154 (e.g., application 1 and application instance N) of the first VPC 110. Similarly, native cloud constructs 122/124 of the second public cloud network 145 enable and support communications between application instances 162 (e.g., application 1 and application instance M) deployed within the second VPC 120.

As shown in FIG. 1, the spoke gateways within the spoke gateway groups 150 and 160 are multiple in number to allow for high availability, redundancy, and disaster recovery in the event that one of the spoke gateways becomes disabled. A similar configuration is provided for the transit VPC in which a plurality of transit gateways are provided for each transit VPC to provide low balancing and also for high availability, redundancy and disaster recovery.

Figure 2A:
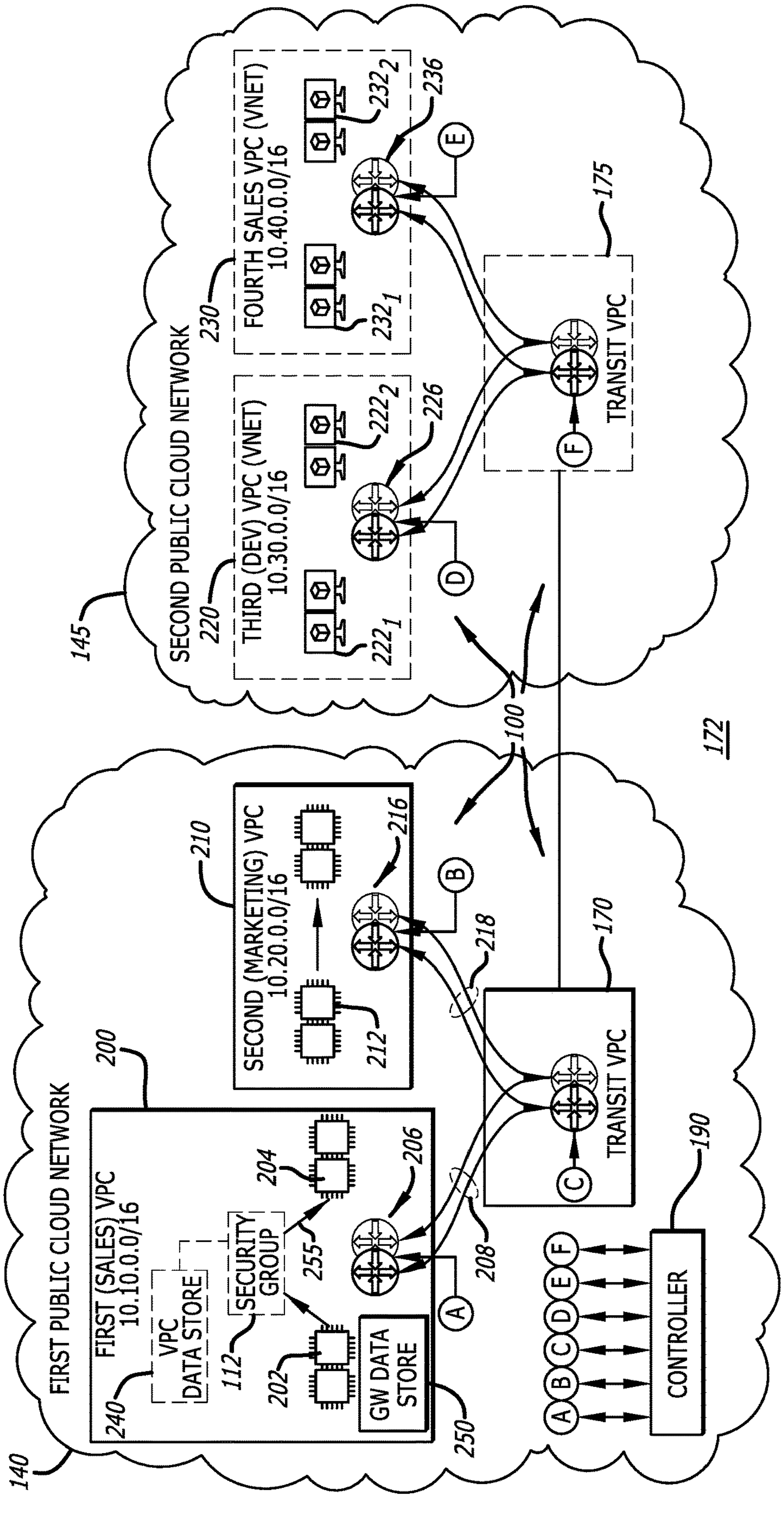
FIG. 2A is an exemplary embodiment of the multi-cloud overlay network of FIG. 1 supporting inter-VPC communications as well as intra-VPC communications within a single or multi-cloud network.

Referring now to FIG. 2A, an exemplary embodiment of the multi-cloud network 142 of FIG. 1 supporting intra-VPC communications as well as inter-VPC communications is shown. Herein, the first public cloud network 140 features a plurality of VPCs, including a first (sales) VPC 200 and a second (marketing) VPC 210. Each of these VPCs 200 and 210 includes application instances, such as the first VPC 200 including a first application instance 202 and a second application instance 204. In addition to the application instances, each of the VPCs 200 and 210 further includes spoke gateway groups 206 and 216, respectively. Each of these spoke gateway groups 206 and 216 are communicatively coupled to the transit VPC 170 via peer-to-peer communications 208 and 218 between the spoke gateways and the transit gateways.

As further shown in FIG. 2A, the second public cloud network 145 includes a plurality of VPCs, including a third (Dev) VPC 220 and a fourth (Sales) VPC 230. In accordance with one embodiment of the disclosure, the third and fourth VPCs 220 and 230 may constitute VNets based on the second public cloud network 145 being deployed as a MICROSOFT® AZURE® cloud service. The third VPC 220 includes a plurality of application instances $\mathbf{222}_1$-$\mathbf{222}_R$ (R≥1) and the fourth VPC 230 includes a plurality of applications $\mathbf{232}_1$-$\mathbf{232}_L$ (L≥1). Similar to the first public cloud network 140, the third VPC 220 includes a spoke gateway group 226 that is communicatively coupled to the transit VPC 175. The fourth VPC 230 includes spoke gateway group 236 that is communicatively coupled to the transit VPC 175. The controller 180 is communicatively coupled to each of the spoke gateways as represented by control lines A, B, D and E as well as each of the transit gateways as represented by control lines C and F.

Herein, communications between the application domains with the same or different VPCs may be supported by security groups (native cloud constructs) or spoke gateways being part of the overlay network 100 of FIG. 1. For communications from a first endpoint (e.g., first application 202), logic within the first VPC 200 (associated with the security group 112) is configured to determine whether a communication (e.g., message transmission) constitutes an intra-VPC communication or an inter-VPC communication. This determination may be based, at least in part, on prior operations conducted by the controller 180, which are relied upon to populate a local data store 240 (referred to as "VPC data store") and/or each gateway (GW) data store 250 with rules (e.g., filtering rules, etc.) for identifying network traffic type (intra-VPC or inter-VPC) and/or controlling the network traffic. These prior operations may involve (1) discovering endpoints of the VPCs, (2) classifying the endpoints to determine the VPC and/or application domain in which the endpoint resides; (3) generating a security group to support intra-VPC network traffic; and (4) generating rules applicable to the security group and spoke gateways to control intra-VPC network traffic and inter-VPC network traffic.

According to one embodiment of the disclosure, communications occurring within the first VPC 200 (e.g., between the first application instance 202 and the second application instance 204) are supported by native cloud constructs within the first public cloud network 140. Stated differently, for a communication 255 from a first endpoint (e.g., first application 202) to a second endpoint (e.g., second application 204), logic associated with the first VPC 200 may be configured to identify whether the communication 255 involves intra-VPC network traffic. As a result, the rules maintained within the VPC data store 240, which are created by the controller 180 based on policies formulated for the tenant, are relied upon by the security group 112 in controlling the routing (or non-routing) of the intra-VPC network traffic 255 between the first and second endpoints 202 and 204. Therefore, the communication 255 is not provided to the spoke gateway group 206, but rather the communication 255 is handled by native cloud constructs.

In contrast, communications from the first endpoint 202 (e.g., first application instance) of the first VPC 200 to a third endpoint (e.g., application instance) 212 within the second VPC 210, a fourth endpoint (e.g., application instance $\mathbf{222}_1$) of the third VPC 220 or a fifth endpoint (e.g., application instance $\mathbf{232}_1$) of the fourth VPC 230 is determined to constitute an inter-VPC communication as the communication will travel outside the first VPC 200. Therefore, the communication is routed to the spoke gateway group 206 for routing via the transit VPC 170 to a corresponding gateway that is associated with the VPC in which the destination application resides (e.g., spoke gateways with spoke gateway group 216 for destination application instance 212). Further discussion and illustration of these types of communications are set forth in FIGS. 4-7.

Figure 2B:
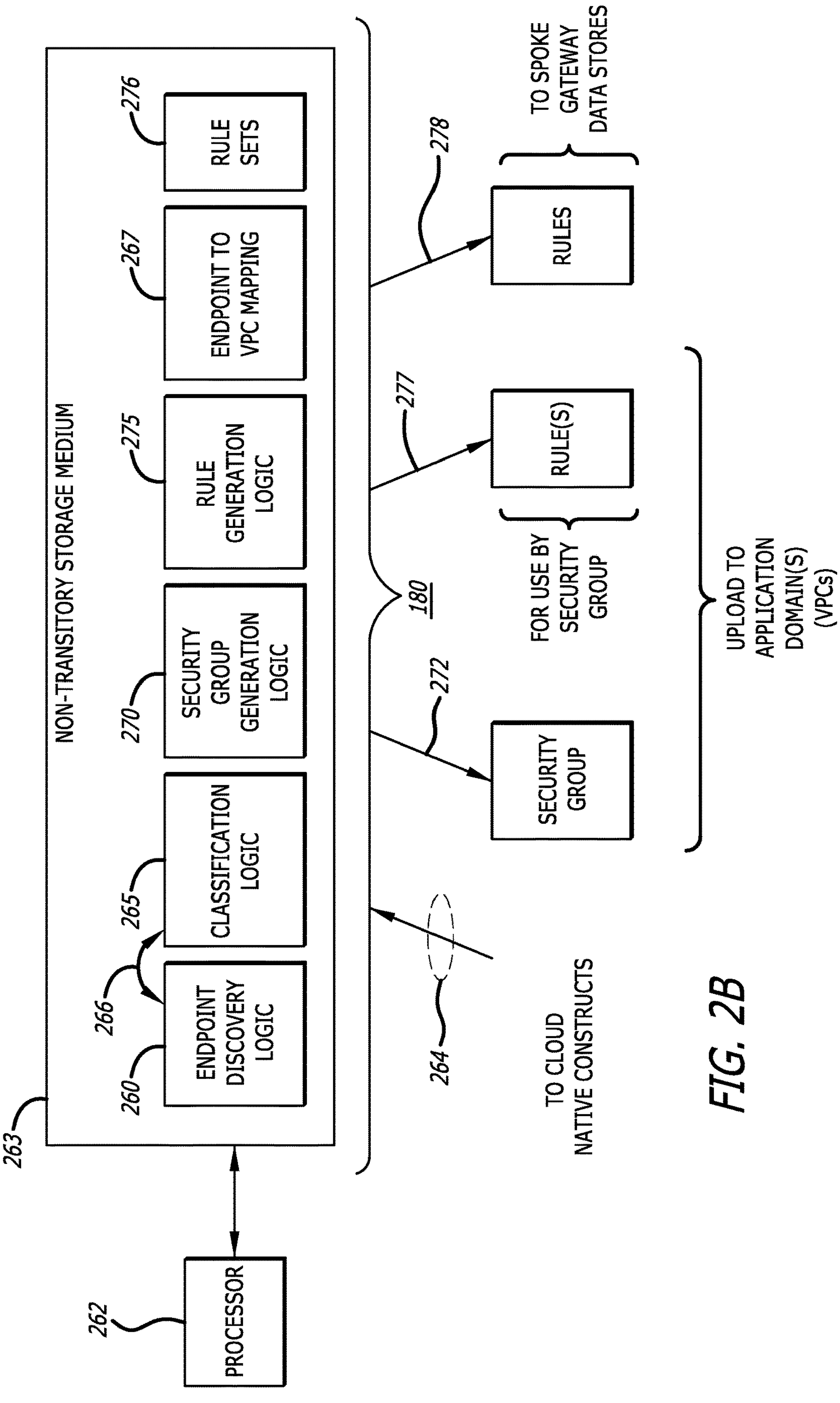
FIG. 2B is an exemplary embodiment of the controller associated with the multi-cloud overlay network supporting separate policy enforcement for intra-VPC network traffic and inter-VPC network traffic.

According to one embodiment of the disclosure, as shown in FIG. 2B, the controller 180 may be configured with logic that supports separate policy enforcement for intra-VPC network traffic and/or inter-VPC network traffic. More specifically, the controller 180 may be configured with logic to support policy enforcement through security group orchestration and spoke gateway configuration. This logic may include, but is not limited or restricted to the following: a processor 262 communicatively coupled to non-transitory storage medium 263 that includes endpoint discovery logic 260, classification logic 265, security group generation logic 270, and/or rule generation logic 275.

In general, referring to FIGS. 2A-2B, the endpoint discovery logic 260 is configured to identify newly added, modified, or deleted endpoints (e.g., VM instances) within one or more public cloud networks 140 and/or 145. The identified endpoint may pertain to an existing application domain or a newly formed application domain. Such identification may be accomplished by (i) polling one or more Application Programming Interfaces (API(s)) 264 of the one or more cloud service provider(s) (CSP(s)) to obtain an inventory of endpoints for the CSP network(s) for comparison to discovered endpoints or (ii) subscribing to a CSP notification system that is configured to provide a current endpoint discovery inventory. Thereafter, contents of the current endpoint discovery inventory are compared to contents of a former endpoint discovery inventory to determine new endpoints or removed endpoints. The current endpoint discovery inventory may be stored by the controller 180.

The classification logic 265 is configured, based on recovered inventory information 266 associated with a newly discovered endpoint for example (e.g., its identifier (e.g., name, data representation, etc.), tag, application domain identifier, VPC identifier), to determine the VPC and/or the application domain upon which the newly discovered endpoint resides. From this information, the controller 180 may be configured to create and maintain an endpoint-VPC identifier mapping 267 for use by the security group generation logic 270 in determining whether or not security group orchestration is needed to support intra-VPC communications between certain endpoints.

Herein, the security group generation logic 270 is configured to generate one or more network security groups 272, each operating as a virtual firewall that is associated with an identified endpoint (e.g., network interface controller of the endpoint). Each network security group 272 subjects a virtual computing device (e.g., AWS elastic compute cloud "EC2" instance, Azure® VM, etc.), responsible for processing network traffic associated with VM instances associated with a particular application domain to the same Open Systems Interconnection (OSI) Transport Layer (L4) policies. The L4 policies are formulated through sets of rules 276 generated by the rules generation logic 275, where the rule sets 276 are designed to filter both incoming and outgoing intra-VPC network traffic from the virtual computing device. Such filtering may constitute a first subset of rules 277 directed to incoming intra-VPC traffic for use by a security group and a second subset of rules 278 directed to outgoing intra-VPC network traffic for use by a spoke gateway group.

As described above, the rule generation logic 275 is configured to generate the first subset of rules 277 enforced by native cloud constructs to perform intra-VPC network traffic controls. Additionally, the rule generation logic 275 may be configured to generate a second subset of rules 278 enforced by one or more spoke gateways to perform inter-VPC network traffic controls. Herein, as the controller 180 is aware of the location of each of the endpoints (software components) within the multi-cloud network, upon a source endpoint (e.g. first application instance) sending a data message to a destination endpoint (e.g., second application instance), the security group is aware whether the may be configured to determine whether the source and destination endpoints are within the same VPC or not. Where the destination endpoint resides within a VPC different than the VPC with the source endpoint, the spoke gateways apply the second subset of rules 278 to enforce selected inter-VPC policies on the data messages (e.g., port restrictions, protocol restrictions, destination restrictions, etc.). Otherwise, where the destination endpoint resides in the same VPC as the source endpoint, the security group (native cloud constructs) applies the first subset of rules 277 to enforce selected intra-VPC policies without involvement of the spoke gateways (e.g., spoke gateways within the spoke gateway group 216).

Figure 2C:
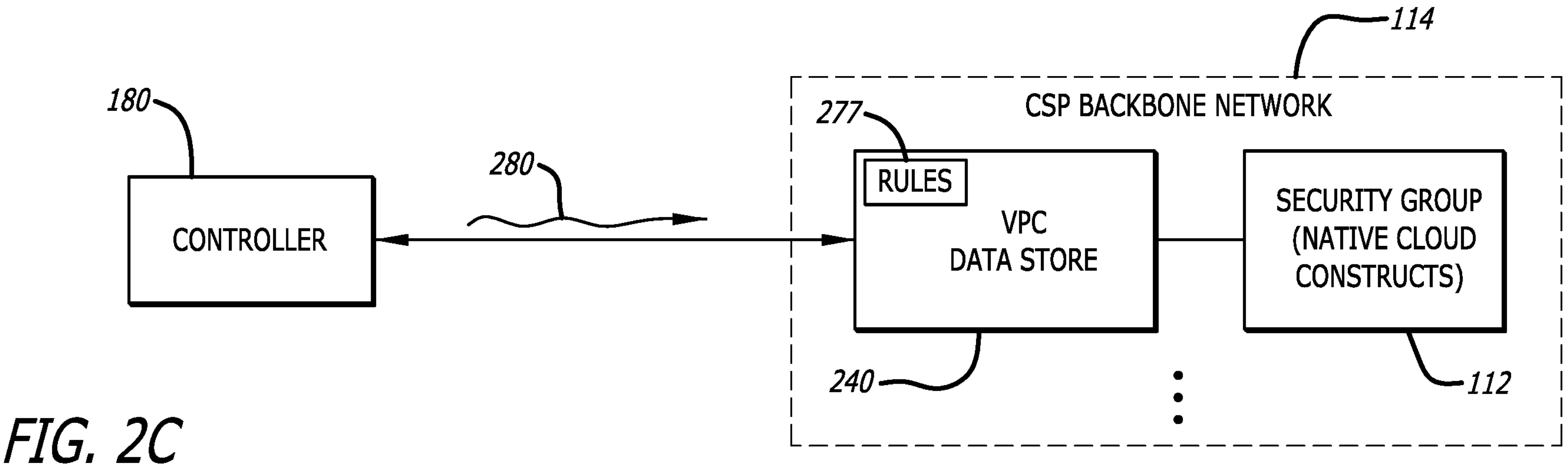
FIG. 2C is an exemplary embodiment of the controller associated with the multi-cloud overlay network for supporting intra-VPC communications.

Referring now to FIG. 2C, an illustrated embodiment of the controller 180 supporting intra-VPC communications, such as communications within the first VPC 110, is shown. Herein, the controller 180 provides control information 280 (e.g., routing rules, security rules, etc.) to the VPC (routing) data store 240 that is provided as part of the CSP backbone network (e.g., CSP network 114 associated with the first public cloud network). The VPC data store 240 provides the security group (native cloud constructs) 112 with access to the control information 280 (e.g., first subset of rules 277), which may control the intra-VPC network traffic to support transmissions in accordance with specific port designations, specific protocol types or permitted destinations (e.g., destination application instances) residing within the same VPC.

Figure 2D:
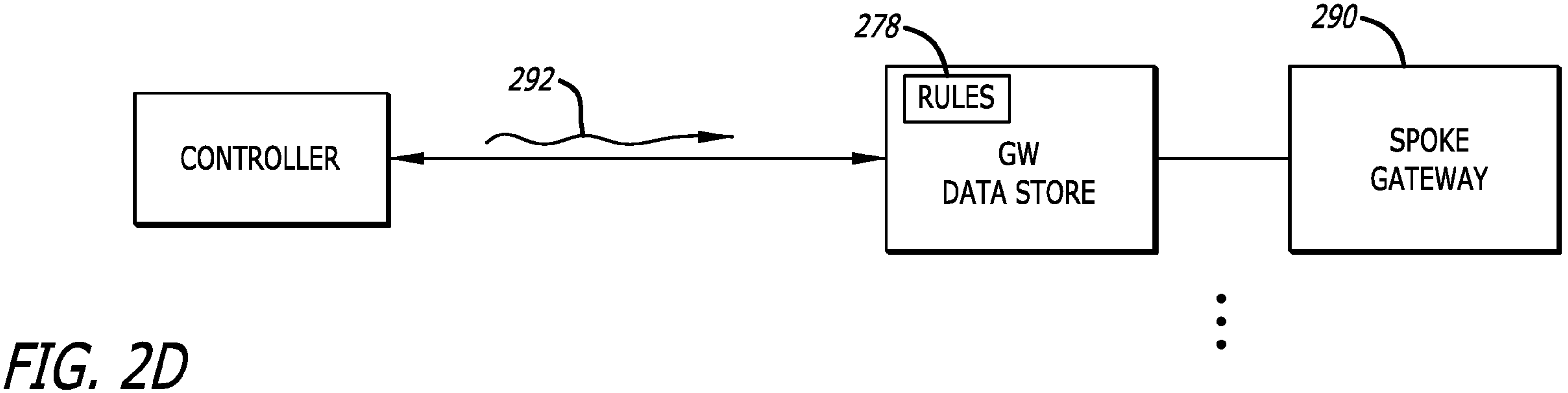
FIG. 2D is an exemplary embodiment of the controller associated with the multi-cloud overlay network for supporting inter-VPC communications.

Referring to FIG. 2D, an exemplary embodiment of the controller 180 associated with the multi-cloud overlay network 100 for supporting inter-VPC communications is shown. Herein, the controller 180 is communally coupled to each spoke gateway (e.g., spoke gateway 290 residing within the spoke gateway group 206 of FIG. 2A). In particular, the controller 180 provides routing control information 292 to the gateway (routing) data store 250. The control information 292 may include the second subset of rules 278, which may be utilized by logic of the spoke gateway 290 to control and discern propagation paths for communications over the multi-cloud overlay network 100. Hence, communications from a source (first application instance) are handled by the spoke gateway 290 for communications associated with a destination (e.g., second application instance, different gateway group or other VPC) that resides in a different VPC from which the spoke gateway 290 resides.

III. Illustrative Intra-VPC & Inter-VPC Communication Flows

Figure 3:
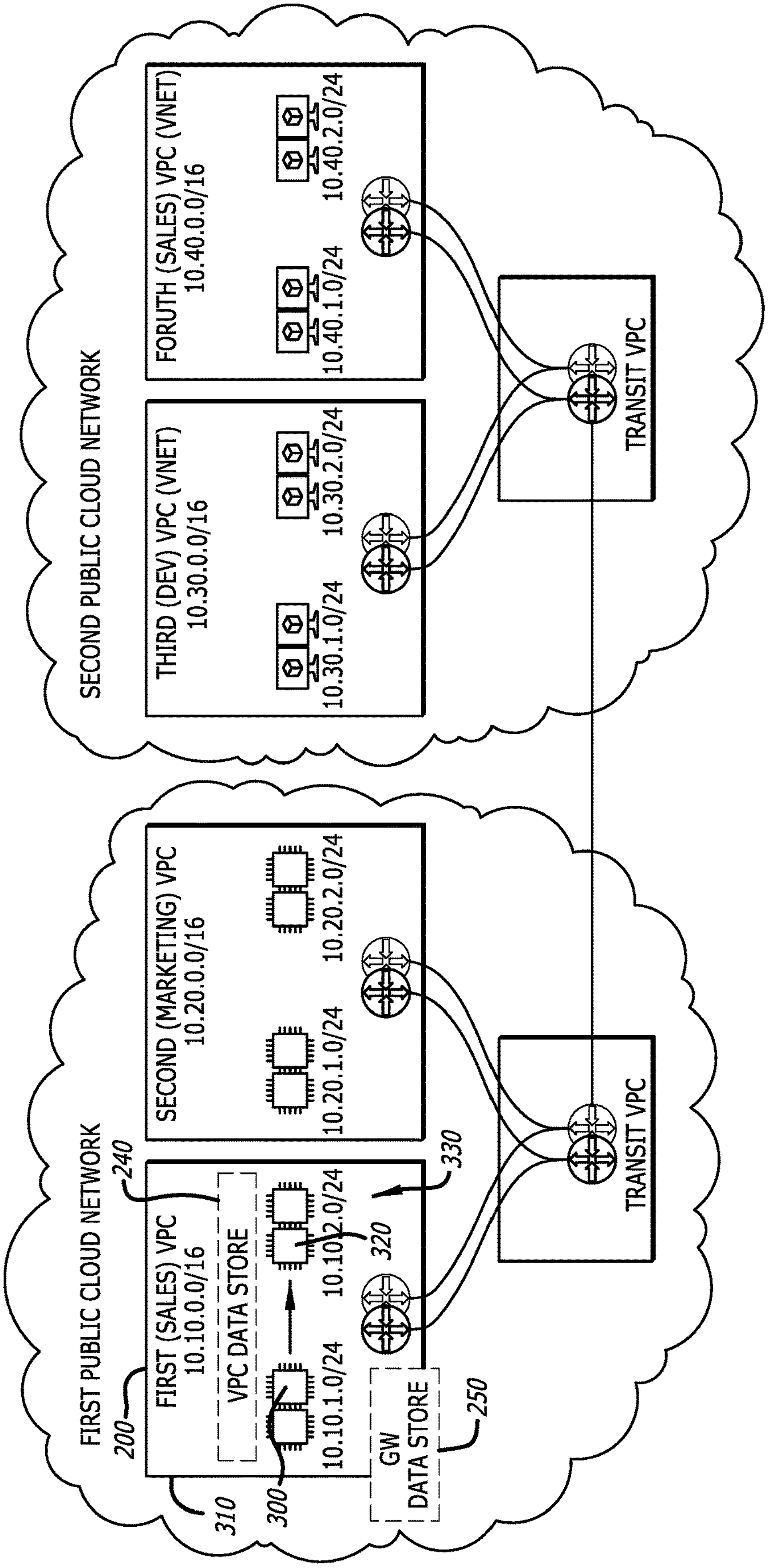
FIG. 3 is a first illustrative embodiment of a first endpoint in intra-VPC communications with a second endpoint deployed within the same VPC as the first endpoint.

Referring now to FIG. 3, a first illustrated embodiment of the control of intra-VPC network traffic is shown. Herein, a first endpoint 300 (e.g., first application instance) within the first VPC 200 is intended to communicate with a second endpoint 320 (e.g., second application instance) residing within the first VPC 200. The determination as to whether the endpoints 300 and 320 reside in the same VPC may be based, at least in part, on a determination whether an IP address of a source of the intra-VPC network traffic (e.g., first endpoint 300 assigned a first IP address 310 (e.g., 10.10.1.0/24)) resides within the same VPC (e.g., first VPC 200 assigned IP address 10.10.0.0/16) as the destination of the intra-VPC network traffic (e.g., second endpoint 310 assigned a second IP address 330, namely 10.10.2.0/24). In response to a communication (message) is directed to the second IP address 330 residing within the same VPC, namely first VPC 200, the VPC data store 240 identifies that the native cloud constructs associated with the first VPC 200 will handle the communications between the first application instance 300 and the second application instance 320. Herein, the gateway (GW) data store 250 does not feature the filtering associated with the second application instance 320, namely IP address 10.10.2.0/24, and thus, does not handle any filtering for communications directed to the second application instance 320 for which the source is within the same VPC (e.g., first VPC 200).

Figure 4:
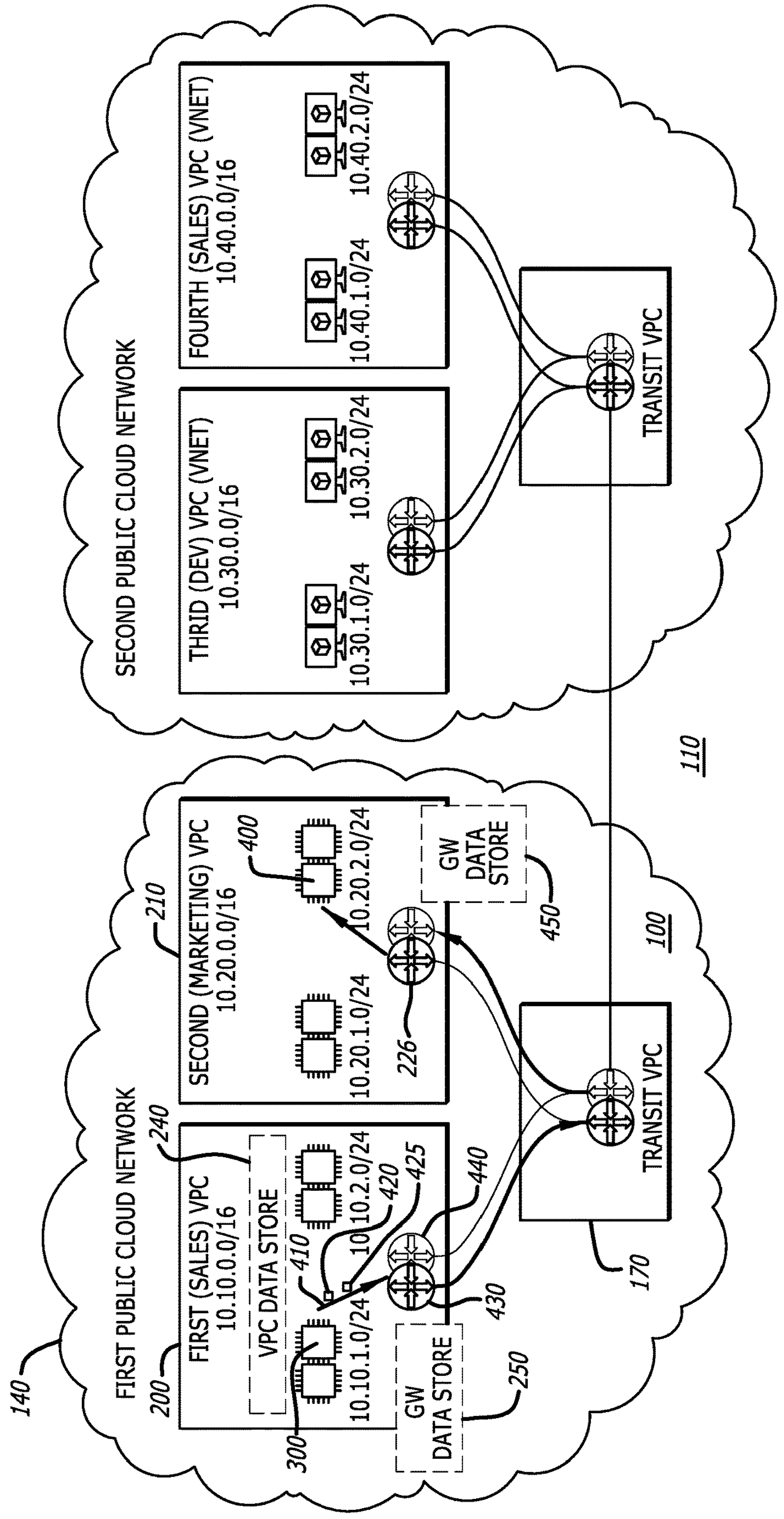
FIG. 4 is a second illustrative embodiment of inter-VPC communications over the multi-cloud overlay network between a first endpoint deployed within a first VPC within a first public cloud network and a second endpoint deployed within a second VPC within the first public cloud network.

Referring to FIG. 4, a second illustrated embodiment of inter-VPC communications over the multi-cloud overlay network 100 between the first endpoint (application instance) 300 deployed within the first VPC 200 within the first public cloud network 140 and a second endpoint (application instance) 400 within the second VPC 210 within the first public cloud network 140 is shown. Herein, the communication (e.g., one or more messages 410) will identify the source and destination for IP addresses 420 and 425, where logic within the native cloud constructs, such as a security group formed by the security group generation logic 270 of FIG. 2B for example, may identify the destination IP address 425 will indicate that targeted destination is not within the first VPC 200 but rather within the second VPC 210. More specifically, the communication 410 will identify the destination IP address 425 as 10.20.2.0/24, which may be used to determine that the IP address of the second application 400 is not within the IP address range associated with the first VPC 200 (10.10.0.0/16).

As a result, the communication 410 relies on one of the spoke gateways 430 or 440 to access the gateway (GW) data store 250 to identify the destination for the communication 410 directed to second application 400. In particular, the communication 410 will identify that the spoke gateways 430/440 are to route the communication 410 over the multi-cloud overlay network 100 via the transit VPC 170 to the spoke security group 216. A gateway (GW) data store 450 utilized by the spoke security group 216 will identify that the IP addresses associated with the application instance 400 and provide the communications thereto. Therefore, inter-VPC communications between different VPCs 200/210 within the same public cloud network 140 are routed via the multi-cloud overlay network 100 and policy rules that govern the communication 410 are made available and applied by the spoke gateway 430 or 440 in lieu of the native cloud constructs that handle intra-VPC communications.

Figure 5:
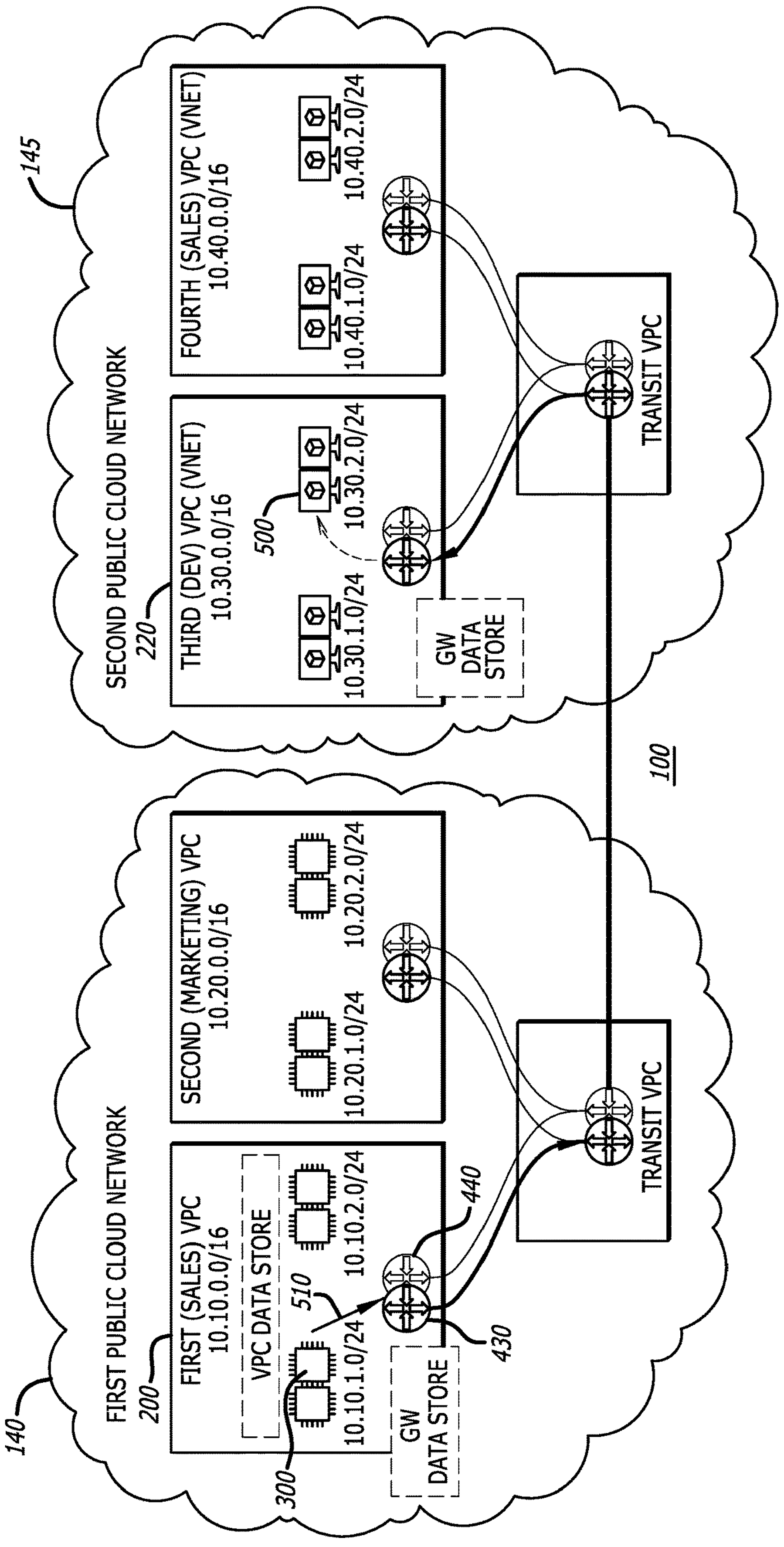
FIG. 5 is a third illustrative embodiment of inter-VPC communications over the multi-cloud overlay network between a first endpoint deployed within a VPC within a first public cloud network and a second endpoint deployed within a VPC within a second public cloud network.

Referring now to FIG. 5, a third illustrated embodiment of inter-VPC communications over the multi-cloud overlay network 100 between the first endpoint (application instance) 300 within the first VPC 200 and a second endpoint (second application instance) 500 deployed in the third VPC 220 located within the second public cloud network 145 is shown. Herein, the network traffic associated with inter-VPC communications features a destination address that is outside (separate) from the IP address range (10.10.0.0/16) offered by the first VPC 200. As a result, the spoke gateway 430 is responsible for enforcement of policy and routing rules necessary for the transmission of message (s) 510 from the first application 300 to the second application instance 500 residing within the third VPC 220.

Figure 6:
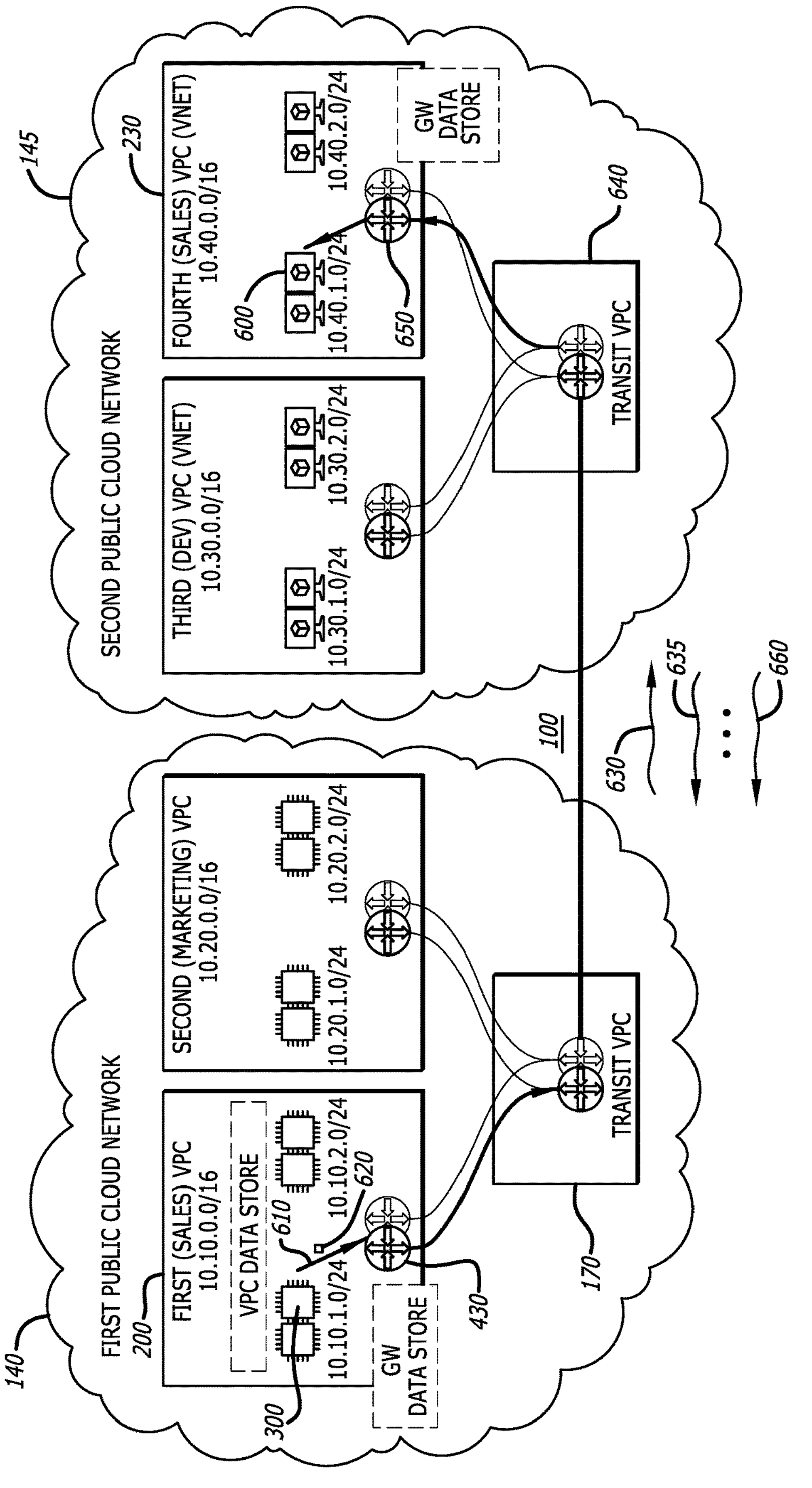
FIG. 6 is a fourth illustrative embodiment of inter-VPC communications over the multi-cloud overlay network between a first endpoint deployed within a VPC within a first public cloud network configured to operate within a second endpoint that is deployed within a VPC within a second public cloud network and operates as a redundant endpoint for the first endpoint.

Referring to FIG. 6, a fourth illustrative embodiment of inter-VPC communications over the multi-cloud overlay network 100 is shown. The inter-VPC communications 610 may constitute message(s) routed between the first endpoint (application instance) 300 deployed within the first VPC 200 within the first public cloud network 140 and a second endpoint 600. The second endpoint 600 may feature an application instance deployed within a the fourth VPC 230 occupying a second public cloud network 145. Herein, the second endpoint 600 operates similar to the first application instance 300 of FIG. 3. The network traffic associated with inter-VPC communications (message(s)) 610 features a destination address 620, which is outside (separate) from the IP address range (10.10.1.0/24) offered by the first VPC 200. As a result, the spoke gateway 430 is responsible for enforcement of policy and routing rules necessary for the transmission of message(s) 610 from the first application instance 300 to the application instance 600 residing within the fourth VPC 230.

Given that the second endpoint 600 is a redundant version of at least a portion of first application instance 300, according to one embodiment of the disclosure, the message(s) 610 may be configured to include commands 630 that are routed via transit VPC 170 and transit VPC 640, before being routed to the second application instance 600 via a spoke gateway VPC 650 associated with the fourth VPC 230. The commands 630 may be configured to activate the application instance 600 and return data 635 after processing of the network traffic by the application instance 600 routed over a data plane (not shown). According to another embodiment of the disclosure, the commands 630 may be configured to access the application instance 600 and retrieve data 660 generated after processing of the network traffic by the application instance 600.

Figure 7:
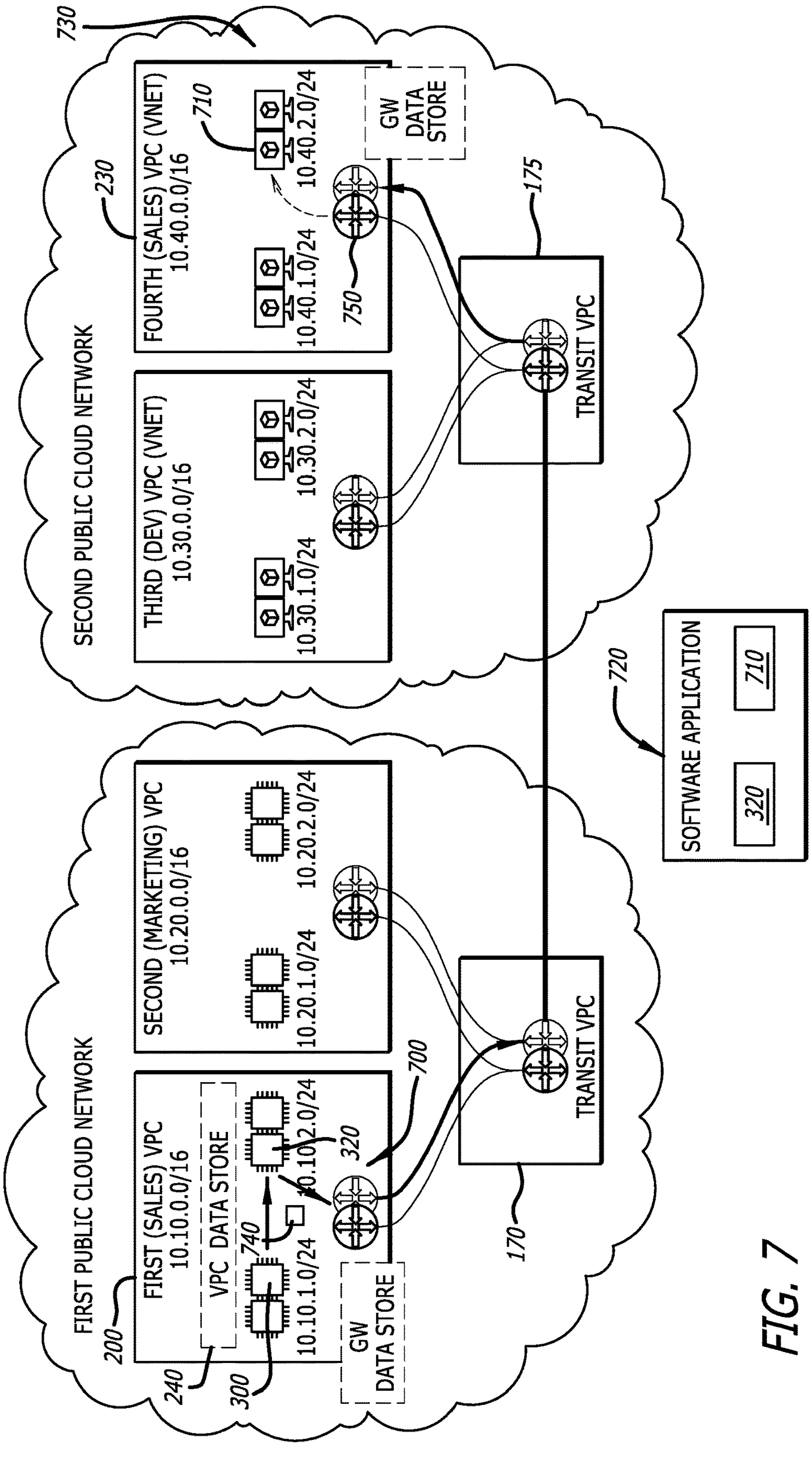
FIG. 7 is a fifth illustrative embodiment of a combination of inter-VPC and intra-VPC communications between endpoints over the multi-cloud overlay network.

Referring now to FIG. 7, a fifth illustrative embodiment of a combination of inter-VPC and intra-VPC communications between endpoints over the multi-cloud overlay network is shown. The first endpoint 300 (e.g., first application instance) resides within the first VPC 200 and is intended to communicate with the second endpoint 320, which also resides within the first VPC 200 and is assigned a first network address 700 (e.g., IP address 10.10.2.0/24). Herein, the second endpoint 320 may correspond to more software instances of a software application, where another software instance (e.g., third application instance) of the software application operates within a different VPC and/or different public cloud network.

As an illustrative example, as shown, a cloud-based software application 720 may be separated into a plurality of application instances, including the second application 320 instance and a third application instance 710, where these application instances 320 and 710 may be positioned within different VPCs and/or different public cloud networks. As shown, the third application instance 710 resides within the fourth VPC 230 being part of the second public cloud network 145 and is assigned a second network address 730 (e.g., IP address 10.40.2.0/24). According to this configuration, native cloud constructs 740 within the first VPC feature content maintained within the VPC data store 240 to discern whether communications from the second application instance 710 constitute intra-VPC or inter-VPC communications. The content may include, but is not limited or restricted to rules and/or the endpoint-VPC identifier mapping 267 that governs determination as to the type of communication.

As shown, the second endpoint 320 may be configured to initiate communications with the third endpoint 710 in which the inter-VPC communications would be detected and filtering rules would be configured to all traffic routing to the first transit VPC 170. Thereafter, the inter-VPC communications is filtered to the second transit VPC 175 before being subsequently routed to the spoke gateways 750 deployed within the fourth VPC 230.

Figure 8:
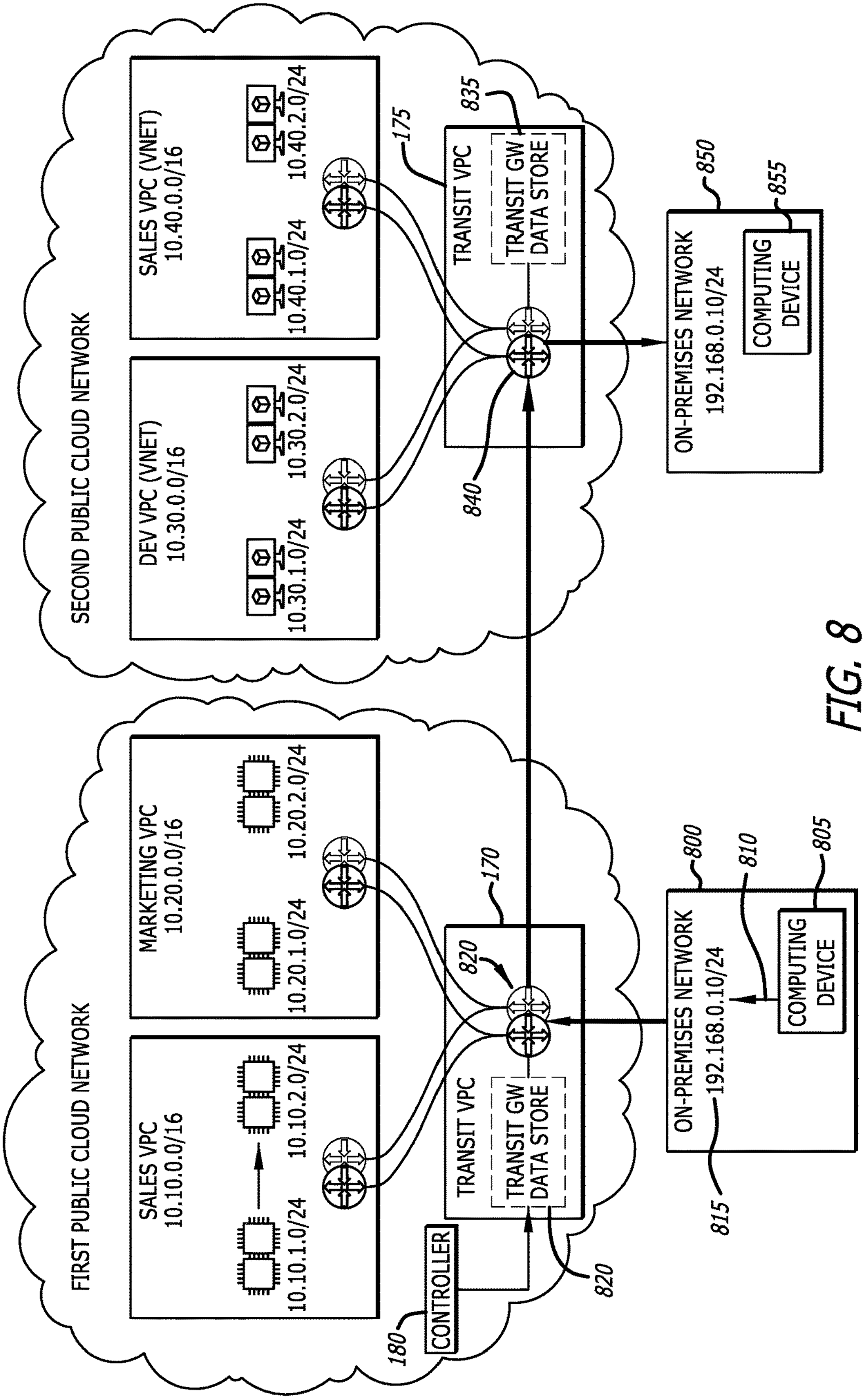
FIG. 8 is a sixth illustrative embodiment of inter-VPC communications over the multi-cloud overlay network between endpoints within on-premises networks.

Referring to FIG. 8, a sixth illustrative embodiment of inter-VPC communications over the multi-cloud overlay network 100 between endpoints represented as computing devices 805 and 855 is shown. Positioned within on-premises networks 800 and 850, the endpoints 805 and 855 are communicatively coupled via the first transit VPC 170 positioned within the first public cloud network 140 and the second transit VPC 175 positioned within the second public cloud network 145.

Herein, a communication 810 (e.g., one or more messages) from the endpoint 805 will identify a source and destination for the communication 810, where logic within the on-premises network, such as the router logic 815 for example, may access a destination IP address of the communication 810 and identify whether the communication is directed to an address range for the on-premises network 800. More specifically, the communication 810 will identify the destination IP address as 192.168.20.10/24, and based on this determination, identify that the communication is targeting the endpoint 855 residing in a different on-premises network 850.

As a result, the communication 810 relies on of the transit gateways 820 within the transit VPC 170 to access the transit gateway (GW) data store 830 to identify the destination for the communication 810 directed to the endpoint 855. In particular, the filtering conducted by the transit gateways 820 is governed by policy rules associated with inter-VPC communications uploaded by the controller 180 into the transit GW data store 830. As a result, the communication 810 relies on transit gateways 820 and 840 to access their corresponding transit GW data stores 830 and 835 in identifying the destination for the communication 810 directed to the endpoint 855.

Figure 9:
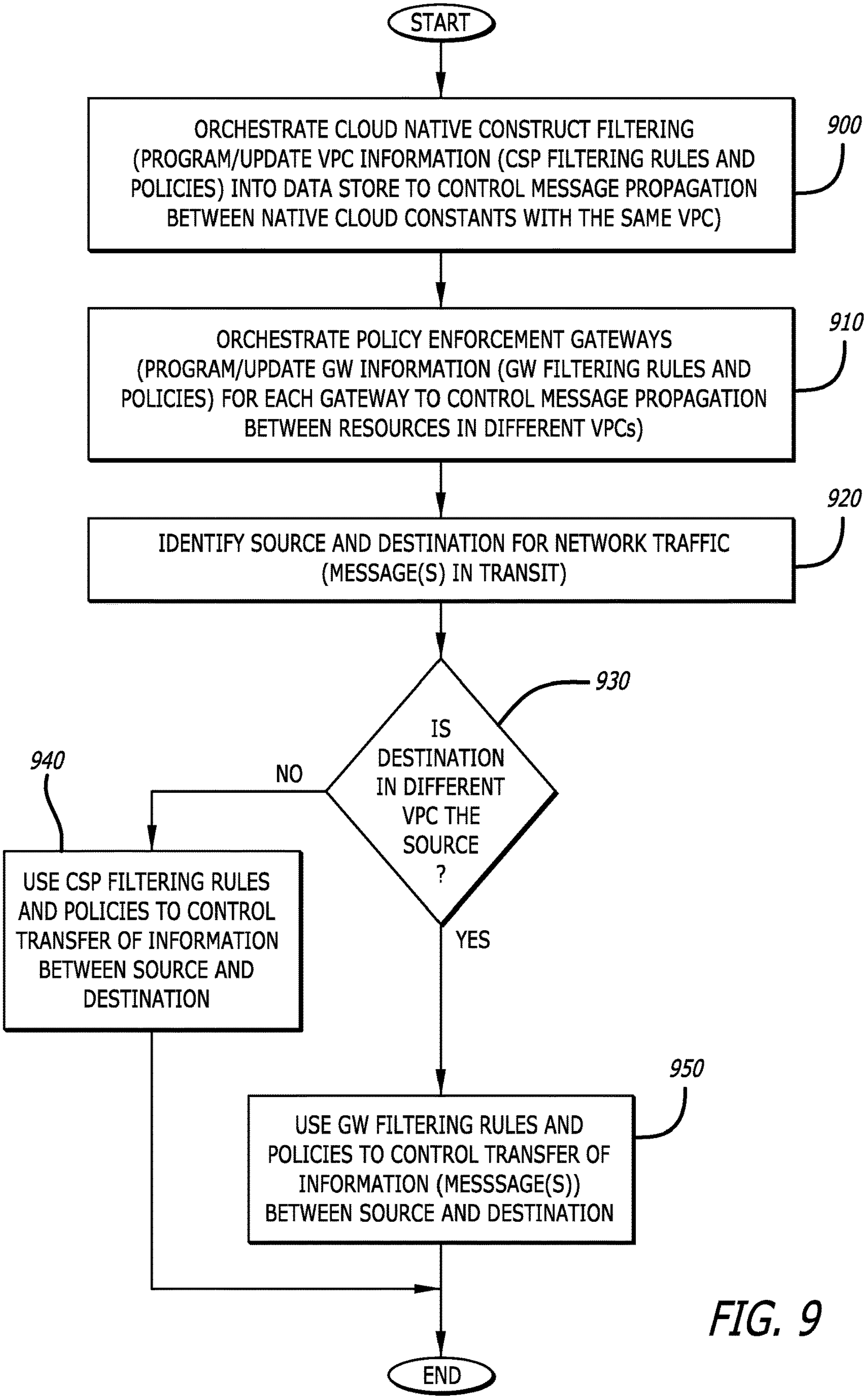
FIG. 9 is an exemplary flowchart outlining operability of the VPC logic.

Referring to FIG. 9, an exemplary flowchart outlining operability of the VPC logic deployed as part of the native cloud construct in determining the components for handling communications from a component within a first VPC (or on-premises network) is shown. Herein, cloud native construct routing is orchestrated (operation 900). This orchestration may include programming and/or updating VPC routing information (e.g., CSP routing rules and policies) in a data store to control message routing between native cloud constructs within the same VPC. Additionally, gateway policy enforcement policy is orchestrated (operation 910). This orchestration may include programming and/or updating gateway routing information (e.g., gateway routing rules and policies) for each gateway to control message routing between resources in different VPCs.

After orchestration, during transit of a communication (e.g., one or more messages), the source and destination of the communication, being part of the network traffic, is determined (operation 920). Where the destination is directed to a VPC (or on-premises network) resides within the VPC (or on-premises network) of the source, the CSP routing rules and policies are relied upon by native cloud constructs to control the transfer of information between the source and destination (operations 930, 940). Hence, the communication is performed entirely within the VPC. However, where the destination is directed to a VPC (or on-premises network) that falls outside the VPC (or on-premises network) of the source, the gateway (GW) routing rules and policies are relied upon by a gateway to control the transfer of information between the source and destination, which utilizes an (multi-cloud) overlay network as described above (operations 930, 950).

Embodiments of the invention may be embodied in other specific forms without departing from the spirit of the present disclosure. The described embodiments are to be considered in all respects only as illustrative, not restrictive. The scope of the embodiments is, therefore, indicated by the appended claims rather than by the foregoing description. All changes that come within the meaning and range of equivalency of the claims are to be embraced within their scope.

What is claimed is:

1. A controller comprising:

a processor; and a non-transitory storage medium communicatively coupled to the processor, the non-transitory storage medium includes:

endpoint discovery logic configured to identify newly added, modified, or deleted endpoints by at least one of (a) polling an Application Programming Interface of a cloud service provider (CSP) to obtain an inventory of endpoints for the CSP for comparison to previously discovered endpoints and (b) subscribing to a CSP notification system that is configured to provide a current endpoint discovery inventory, classification logic that, based on recovered information associated with a newly discovered endpoint, determines a virtual region in which the newly discovered endpoint resides, security group generation logic configured to generate one or more network security groups, each network security group operating as a virtual firewall that is associated with an identified endpoint, rule generation logic configured to (a) generate a first subset of rules for controlling a flow of a first message between a destination and a source via native cloud constructs associated with a cloud service provider (CSP) underlay network when the destination and source reside within a first virtual region, the first subset of rules being enforced by a network interface controller of the cloud-based instance and (b) generate a second subset of rules for controlling a flow of a second message between the destination and the source via an overlay network providing communications between the first virtual region and a second virtual region when the destination and the source reside within different virtual regions, the second subset of rules being applied by a spoke gateway between the source and the destination, the second message being configured to include commands configured to activate an application instance in the second virtual region and return data after the application instance processes network traffic.

2. The controller of claim 1, wherein the first virtual region corresponds to a first virtual private cloud network (VPC) and the second virtual region corresponds to a second VPC.

3. The controller of claim 1, wherein the newly added, modified, or deleted endpoints are within one or more public cloud networks including the first virtual region and the second virtual region.

4. The controller of claim 2, wherein the first VPC resides within a first public cloud network and a second VPC resides within a second public cloud network different than the first public cloud network.

5. The controller of claim 2, wherein the second set of rules include filtering rules that formulate one or more policies that influence a propagation of inter-VPC network traffic over the overlay network establishing a communication path between the first VPC and the second VPC.

6. The controller of claim 3, wherein the recovered information associated with the newly discovered endpoint includes an identifier of the endpoint and an identifier of the virtual region.

7. The controller of claim 5, wherein the first set of rules include filtering rules that formulate one or more policies that influence a propagation of intra-VPC network traffic over the underlay network.

8. The controller of claim 6, wherein the identifier of the virtual region includes a virtual private cloud network (VPC) identifier upon which the newly discovered endpoint resides.

9. The controller of claim 8, wherein the non-transitory storage medium further comprises logic to create and maintain an endpoint-to-VPC identifier mapping for use in determining whether or not security group orchestration Is needed to support intra-VPC communications between the source and the destination.

10. A method for controlling network traffic flow separation between inter-VPC communications and intra-VPC communications, comprising:

recovering information that identifies newly added, modified, or deleted endpoints within one or more public cloud networks, wherein the recovering comprises at least one of (a) polling an Application Programming Interface of a cloud service provider (CSP) to obtain an inventory of endpoints for the CSP for comparison to previously discovered endpoints and (b) subscribing to a CSP notification system that is configured to provide a current endpoint discovery inventory;

based on recovered information associated with a newly discovered endpoint, determining a virtual region in which the newly discovered endpoint resides;

generating one or more network security groups, each network security group operating as a virtual firewall that is associated with an identified endpoint;

generating a first subset of rules for controlling a flow of a first message sourced by or destined to the newly discovered endpoint via native cloud constructs associated with a cloud service provider (CSP) underlay network when the newly discovered endpoint and another endpoint in communication with and operating as a destination and a source of the flow of the first message with the newly discovered endpoint reside within a first virtual region, the first subset of rules being applied by the network security group associated the identified endpoint for the first message sent from the source to the destination;

generating a second subset of rules for controlling a flow of a second message sourced by or destined to the newly discovered endpoint via an overlay network providing communications between the first virtual region and a second virtual region when the newly discovered endpoint and another endpoint reside within different virtual regions, the second subset of rules being applied by a spoke gateway between the source and the destination, the second message comprising commands configured to activate an application instance in the second virtual region and return data after the application instance processes network traffic.

11. The method of claim 10, wherein the first virtual region corresponds to a first virtual private cloud network (VPC) and the second virtual region corresponds to a second VPC.

12. The method of claim 10, wherein the recovered information associated with the newly discovered endpoint includes an identifier of the endpoint and an identifier of the first virtual region.

13. The method of claim 10 further comprising:

creating and maintaining an endpoint-to-VPC identifier mapping for use in determining whether or not security group orchestration is needed to support intra-VPC communications between the newly discovered endpoint and another endpoint.

14. The method of claim 11, wherein the first VPC resides within a first public cloud network and a second VPC resides within a second public cloud network different than the first public cloud network.

15. The method of claim 11, wherein the second set of rules include filtering rules that formulate one or more policies that influence a propagation of inter-VPC network traffic over the overlay network establishing a communication path between the first VPC and the second VPC.

16. The method of claim 15, wherein the first set of rules include filtering rules that formulate one or more policies that influence a propagation of intra-VPC network traffic over the underlay network.

17. A non-transitory storage medium including logic that, upon execution, controls flow separation for inter-VPC communications and intra-VPC communications, comprising:

endpoint discovery logic configured to identify newly added, modified, or deleted endpoints within a plurality of public cloud networks by at least one of (a) polling an Application Programming Interface of a cloud service provider (CSP) to obtain an inventory of endpoints for the CSP for comparison to previously discovered endpoints and (b) subscribing to a CSP notification system that is configured to provide a current endpoint discovery inventory;

classification logic configured, based on recovered information associated with a newly discovered endpoint, to determine a virtual region in which the newly discovered endpoint resides;

security group generation logic configured to generate one or more network security groups, each network security group operating as a virtual firewall that is associated with an identified endpoint;

rule generation logic configured to (i) generate a first subset of rules for controlling a flow of a first message between a destination and a source via native cloud constructs associated with a cloud service provider (CSP) underlay network when the destination and source reside within a first virtual region, the first subset of rules being applied by the network security group associated the identified endpoint for the first message sent from the source to the destination and (ii) generate a second subset of rules for controlling a flow of a second message between the destination and the source via an overlay network providing communications between the first virtual region and a second virtual region when the destination and the source reside within different virtual regions, the second subset of rules being applied by a spoke gateway between the source and the destination, the second message comprising commands configured to activate an application instance in the second virtual region and return data after the application instance processes network traffic.

18. The non-transitory storage medium of claim 17, wherein the second subset of rules includes a rule that controls and filter the second message over the overlay network when the source resides in the first virtual region included in the first public cloud network and the destination resides in the second virtual region included in the second public cloud network.

* * * * *